INVENTOR.
ROBERT B. HERDEN

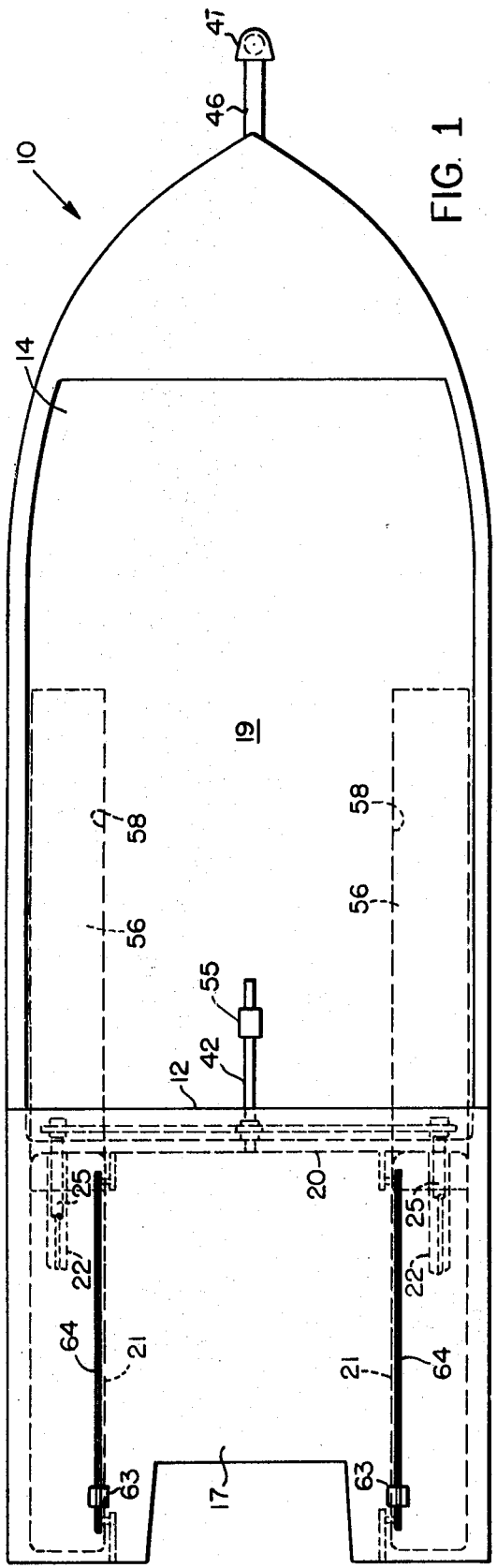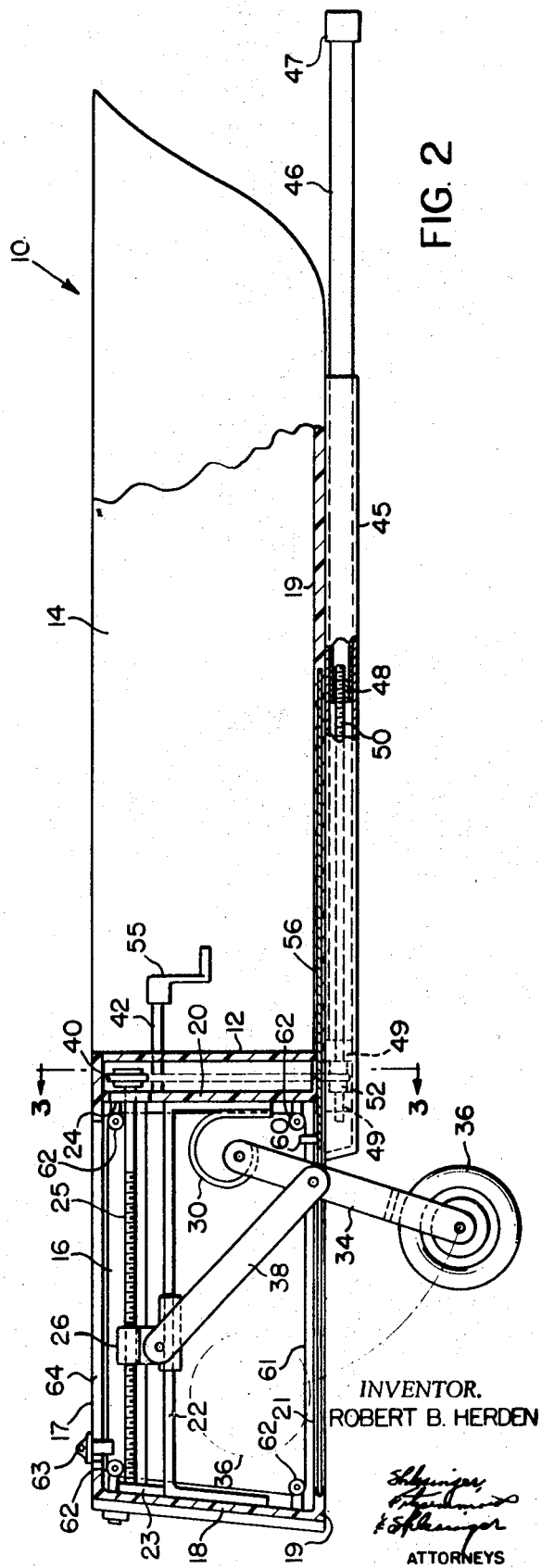

BY

ATTORNEYS

Sept. 28, 1971  R. B. HERDEN  3,608,111
BOAT WITH RETRACTABLE TRAILER WHEELS AND HITCH
Filed Oct. 8, 1969  3 Sheets-Sheet 3
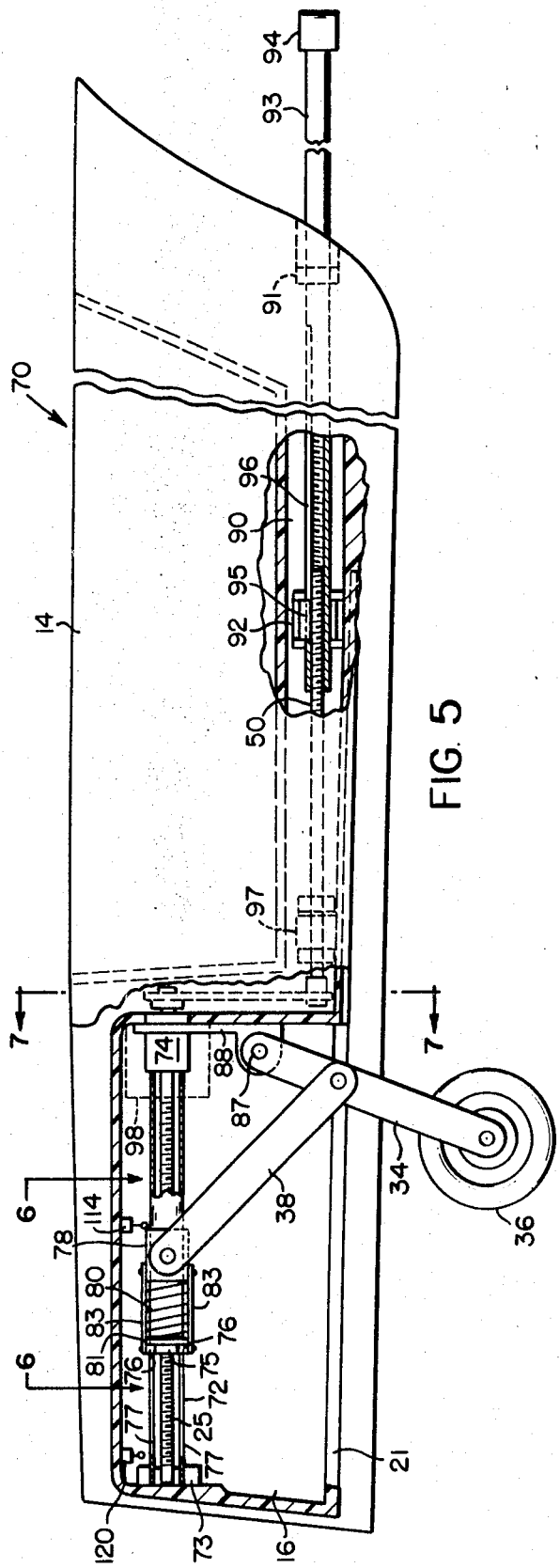
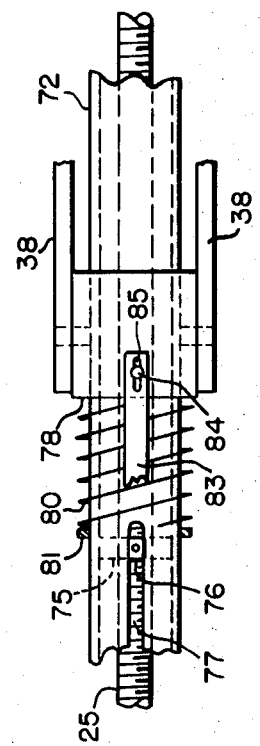
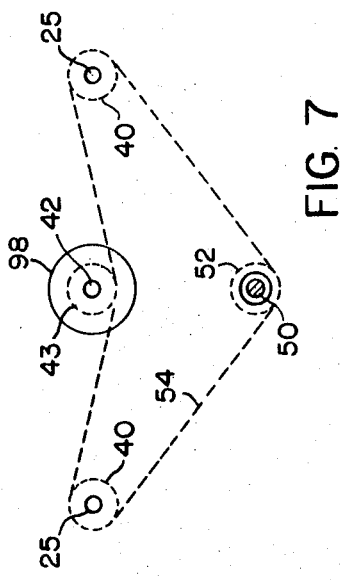
INVENTOR.
ROBERT B. HERDEN
BY
ATTORNEYS

United States Patent Office 3,608,111
Patented Sept. 28, 1971

3,608,111
BOAT WITH RETRACTABLE TRAILER WHEELS AND HITCH
Robert B. Herden, 428 Woodland Lane, Webster, N.Y. 14580
Filed Oct. 8, 1969, Ser. No. 864,834
Int. Cl. B63c 13/00
U.S. Cl. 9—1T                10 Claims

ABSTRACT OF THE DISCLOSURE

Mounted in a hollow wheel well or housing formed in the back of an outboard type boat, for example, are two, parallel, horizontal drive screws connected to a common drive shaft. Two conventional trailer wheels are connected by collapsible linkages to two drive blocks mounted to reciprocate in opposite directions on the drive screws to shift the wheels into and out of the wheel well through openings in the bottom thereof. A conventional trailer hitch is mounted on the forward end of a retractable beam that reciprocates in and out of a housing on the bottom of the boat. The beam is connected to the drive shaft by a third drive screw which advances or retracts the beam in unison with the trailer wheels. Slidable covers are provided for closing the wheel openings in the wheel well, when the wheels are retracted.

---

This invention relates to boats, and more particularly to a boat of the type having a retractable trailer mechanism for transporting the boat on land.

Heretofore several attempts have been made to provide a boat having retractable wheels suitable for replacing a conventional boat trailer. The retractable wheel mechanisms for such boats, however, have heretofore been extremely cumbersome and difficult to operate. Most such boats, for example, require several different manual operations to raise or lower the retractable wheels, and to mount or dismount the trailer hitch which must be provided for connecting the boat to an automobile, or the like, for travel over the road. A further disadvantage of such prior boats is that the addition of the retractable wheels has usually resulted in disadvantages in the structure and handling of the boat, or caused impractical launching procedures.

It is an object of this invention to provide a novel boat having a retractable trailer mechanism that is extremely simple to operate, and which can be incorporated in a boat without interfering unduly with the performance of the boat in water.

A further object of this invention is to provide a boat of the type described having a pair of retractable wheels, and a retractable trailer hitch, which is connected to the wheels for extension and retraction therewith.

Another object of this invention is to provide a power-operated trailer mechanism for operating the retractable wheels and trailer hitch of a boat of the type described.

Another object of this invention is to provide for boats of the type described, novel means for sealing the wheel wells of a boat when the associated trailer wheels are in their retracted positions.

Other objects of the invention will be apparent hereinafter from the specification and from the recital of the appended claims, particularly when read in conjunction with the accompanying drawings.

In the drawings:

FIG. 1 is a plan view of a boat made in accordance with one embodiment of this invention, the retractable trailer hitch for the boat being illustrated in its extended position;

FIG. 2 is a side elevational view of this boat with parts thereof cut away and shown in section, and with the retractable trailer wheels and hitch illustrated in their extended or operative positions;

FIG. 5 is a fragmentary side elevational view of a modified boat made in accordance with a second embodiment of this invention, parts of the boat being broken away and illustrated in section;

FIG. 6 is an enlarged, fragmentray plan view of part of the wheel retracting mechanism for this boat looking in the direction of arrows 6—6 in FIG. 5;

FIG. 7 is a fragmentary sectional view taken along the line 7—7 in FIG. 5 and illustrating schematically the drive system for moving in unison the retractable wheels and trailer hitch of this modified boat.

Figure 3:
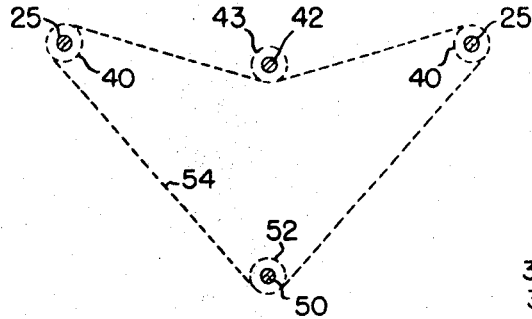
FIG. 3 is a fragmentary sectional view taken along the line 3—3 in FIG. 2 looking in the direction of the arrows and illustrating schematically the drive system for moving the trailer wheels and hitch in unison.

Referring now to the drawings by numerals of reference, and first to the embodiment illustrated in FIGS. 1 to 4, 10 denotes generally a boat having a configuration similar, for example, to the conventional outboard variety of boat. Adjacent its stern or rear end boat 10 has a transverse partition or wall 12, which sepaartes the forward, open passenger area 14 of the boat from a hollow wheel well or chamber 16 formed in the rear end of the boat. This chamber is closed at its upper end by a removable, horizontal top wall 17, at its rear end by a stationary end wall 18, at its lower end by the bottom wall 19 of the boat, and at its forward end by a further transverse partition or wall 20, that extends across the boat rearwardly of wall 12, and in closely spaced, parallel relation thereto. Adjacent opposite sides of chamber 16 the boat bottom 19 has therethrough two, elongate, parallel wheel openings 21 for a purpose to be described below.

Figure 4:
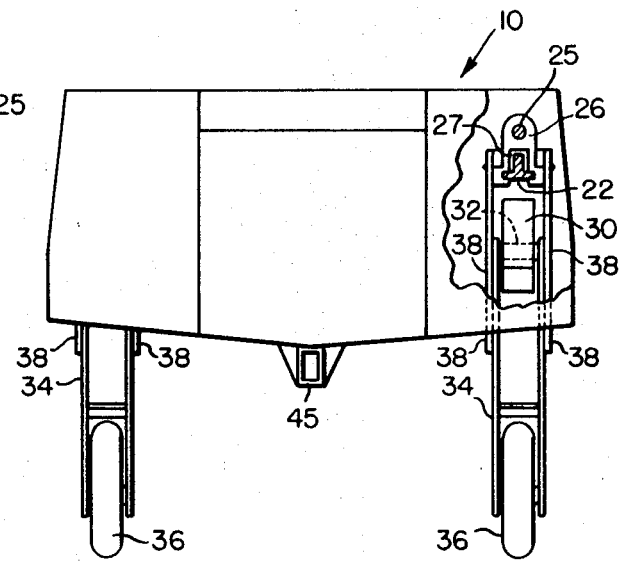
FIG. 4 is a rear end view of this boat with parts thereof cut away and shown in section.

Fastened at opposite ends thereof to the insides of the walls 18 and 20, and extending between opposite ends of the chamber 16 adjacent opposite sides thereof, are two, spaced, parallel brackets or main beams 22, each of which is inverted T-shaped in cross section. Rotatably journaled at opposite ends thereof in bearings 23 and 24 (FIG. 2) that are fastened to the walls 18 and 20, respectively, are two, externally threaded drive screws 25, each of which rotates above, and parallel to, one of the main beams 22. Mounted on each screw 25 for adjustment longitudinally thereof is an internally threaded nut or drive block 26, only one of which is illustrated in FIGS. 2 and 4. In its lower end each drive block 26 has a longitudinally extending, inverted T-shaped recess 27 (FIG. 4) by means of which each block 26 is slidably guided on its associated main beam 22 for sliding movement longitudinally thereof upon rotation of the associated drive screw 25.

Secured beneath the forward ends of beams 22 in chamber 16 are two spaced suspension springs 30, only one of which is illustrated in FIGS. 2 and 4. Each spring 30 has a partially coiled free end, that is positioned above the forward end of one of the openings 21 in the boat bottom. Fastened to the free end of each spring 30 with its axis extending transverse to the boat is a short stub shaft 32 (FIG. 4). Pivotally connected at their upper ends to opposite ends of the shafts 32 are two conventional, bifurcated or double plate wheel struts 34. Rotatably mounted in the opposite end of each strut 34 is a conventional inflatable rubber tire 36. Each strut 34 is connected to one of the drive blocks 26 by a pair of links 38, which are pivotally connected at their upper ends to opposite sides of the associated block 26, and at their lower ends to opposite sides of the associated strut 34 intermediate the ends thereof.

At its forward end each drive screw 25 projects into the space between the partitions 12 and 20, and has fastened thereon a sprocket wheel 40 (FIGS. 2 and 3). Rotatably journaled adjacent its rear end in the partitions 12 and 20, and extending forwardly of wall 12 adjacent the center of the boat is a rotatable crank shaft 42. Fastened to the shaft 42 between the walls 12 and 20 is a further sprocket wheel 43.

Secured to the underside of the boat bottom 19, and extending longitudinally of the boat medially of its sides is an elongate, tubular housing 45, which is rectangular in cross section. As shown more clearly in FIG. 2, the forward end of housing 45 is spaced rearwardly of the forward end of the boat; and its rear end extends slightly beyond, or rearwardly of, the partition 20. Slidably mounted at its rear end in the forward end of housing 45 is a tubular beam or trailer tongue 46, which is also rectangular in cross section, and which carries on its forward end a conventional trailer hitch 47, for releasably fastening beam 46 to an automobile, or the like.

Fastened in the rear end of beam 46 is a hollow bearing 48. Threaded at its forward end into an internally threaded bore in the bearing 48, and rotatably journaled at its rear end in spaced bearings 49, which are fastened in the rear end of housing 45, is an elongate, externally threaded drive screw 50. Between the bearings 49 the screw 50 has fastened thereon a sprocket wheel 52 (FIGS. 2 and 3), which is drivingly connected by a chain 54 to the sprockets 40 and 43 in such manner that, upon the rotation of the crank shaft 42, the drive screws 25 and 50 will be rotated in unison.

The crank shaft 42 is adapted to be rotated by a conventional crank 55 (FIGS. 1 and 2), which is removably mounted on the forward end of shaft 42. When the shaft 42 is rotated in one direction by the crank, for example in a direction to retract the wheels 36 and the beam 46 from their extended positions as shown in FIGS. 1, 2 and 4, the threaded drive screws 25 operate to shift the drive blocks 26 rearwardly or to the left in FIG. 2, thus causing the links 38 to swing the struts 34 upwardly and rearwardly until the wheels 36 reach their retracted positions within the chamber 16 as illustrated by broken lines in FIG. 2.

At the same time that the blocks 26 are driven rearwardly on the screws 25, the rotating drive screw 50 causes the internally threaded block 48, and hence the beam 46, to be drawn rearwardly in the housing 45 until the trailer hitch 47 has been drawn rearwardly beneath the front end of the boat. At the same time that the wheels 36 become fully retracted into the chamber 16, the trailer beam 46 will have been fully retracted also. At this time the hitch 47, which may be removably mounted on the forward end of the beam 46, may be removed to minimize the drag on the boat, when the latter is used in the water.

After the wheels 36 and beam 46 have been fully retracted, the wheel openings 21 are adapted to be closed by two, elongate, flat cover plates 56, which are mounted in the bottom of the boat to slide between the openings 21, and a pair of recesses 58 that are formed in the boat bottom wall 19 forwardly of the openings 21. In their open positions, the rear ends of plates 56 project into the forward ends of openings 21. A lug 60, which is fixed to the rear end of each plate 56, is fastened to the lower run of one of two, endless operating cables 61. Each cable 61 is mounted on four, spaced pulleys 62 for reciprocation in a vertical plane adjacent the inner edge of each opening 21.

To close the wheel opening 21, after retraction of wheels 36, the plates 56 are shifted rearwardly by two, manually operable slide blocks 63, which are mounted to reciprocate in a pair of spaced, parallel slots 64 formed in the top wall 17 above the inner sides of slots 21. The blocks 63 are secured at their lower ends to the upper runs of the cables 61 so as to draw the cables in a direction to pull the covers closed over openings 21, when the blocks 63 are shifted from their ilustrated positions toward the opposite ends of slots 64.

In order to move the wheels 36 and the beam 46 from their retracted to their extended positions, when the boat is to be drawn on land, the cover plates 56 are first shifted from closed to open positions (FIGS. 1 and 2) by shifting the slide blocks 63 manually from positions adjacent the right or forward ends of slots 64 back to the positions as illustrated in FIGS. 1 and 2. The shaft 42 is then rotated by the crank in a direction to advance the blocks 26 from the left to the right in FIG. 2, and to cause the bearing block 48, and hence the beam 46, to be shifted also from the left to the right in this figure until the two wheels 36 and the beam 46 once again reach their fully extended positions. The now-extended hitch 47 is then connected in the usual manner to the rear of the vehicle that is used to draw the boat on land.

Referring now to the embodiment illustrated in FIGS. 5 to 8, and where like numerals are employed to designate elements similar to those employed in the embodiment illustrated in FIG. 1, 70 denotes generally a modified boat having a power-operated retractable wheel and trailer beam mechanism, which is particularly adapted for heavier boats of the type using relatively large outboard engines with electric starters, or inboard outdrive marine engines. In this embodiment each drive screw 25 rotates in the bore of an elongate, stationary tube or sleeve 72, opposite ends of which are fastened by brackets 73 and 74 to opposite ends, respectively, of the wheel well or chamber 16.

Threaded on each screw 25 for axial sliding movement in the associated sleeve 72 is a drive nut 75 (FIGS. 5 and 6), which has at diametrally opposite sides thereof a pair of opposed, integral keys or shoulders 76, which project through, and are slidably guided in, a pair of longitudinally extending slots 77 formed in diametrally opposite sides of the sleeve 72 adjacent the rear or left end thereof as illustrated in FIGS. 5 and 6.

Mounted for axial sliding movement on each tube 72 forwardly of the associated nut 75 is a drive block 78 having a rectangular, external configuration. Surrounding each tube 72 between its nut 75 and its block 78 is a coiled compression spring 80, one end of which seats against the associated block 78, and the opposite end of which is seated against a retainer ring 81, which is slidable on each sleeve 72, and which is seated against the shoulders 76 on the associated nut 75. The shoulders 76 on each nut are connected by a pair of rigid straps 83 with the associated block 78. The straps 83 of each pair are rigidly connected to the associated nut 75, but at their opposite ends are connected to block 78 by screws 84, which extend slidably through elongate slots 85 in the forward ends of the straps 83 so that each block 78 will have limited axial movement relative to the associated straps 83 and nut 75.

In this embodiment the upper end of each wheel strut 34 is pivoted on a pin 87 (FIG. 5), which is mounted on a stationary bracket 88 that is fixed beneath each tube 72 at the forward end of the wheel well 16. Intermediate its ends each strut 34 is pivotally connected by two links 38 to opposite sides of one of the drive blocks 78, so that road shocks will be transmitted through the links 38 and the drive blocks 78 to the compression springs 80.

Fastened in an elongate, central recess 90, which is formed in the hull of boat 70 beneath the passenger area 14, are two spaced bearings 91 and 92. Mounted intermediate its ends for axial sliding movement in the bearings 91 and 92 is an elongate, tubular trailer beam 93, having on its forward end a conventional trailer hitch 94. Beam 93 is circular in cross section; and to secure it against rotation, a radial key 95 is secured in the bearing 92, and slides in an elongate, axial slot 96 formed in the beam 93 adjacent the rear end thereof.

Threaded at its forward end into the rear end of the bore in beam 93, and rotatably journaled adjacent its rear end in a further bearing 97 secured in the recess 90 rearwardly of bearing 92, is the trailer beam drive screw 50. At its rear end the screw 50 has secured thereon the sprocket wheel 52, which, as in the case of the first embodiment, is connected to the sprocket wheels 40 and 43 by a chain 54. In this embodiment, however, the shaft 42 is driven by a motor 98 (FIGS. 5, 7 and 8), which is mounted in the wheel well 16 with its armature shaft connected to the drive shaft 42 in any conventional manner.

Figure 8:
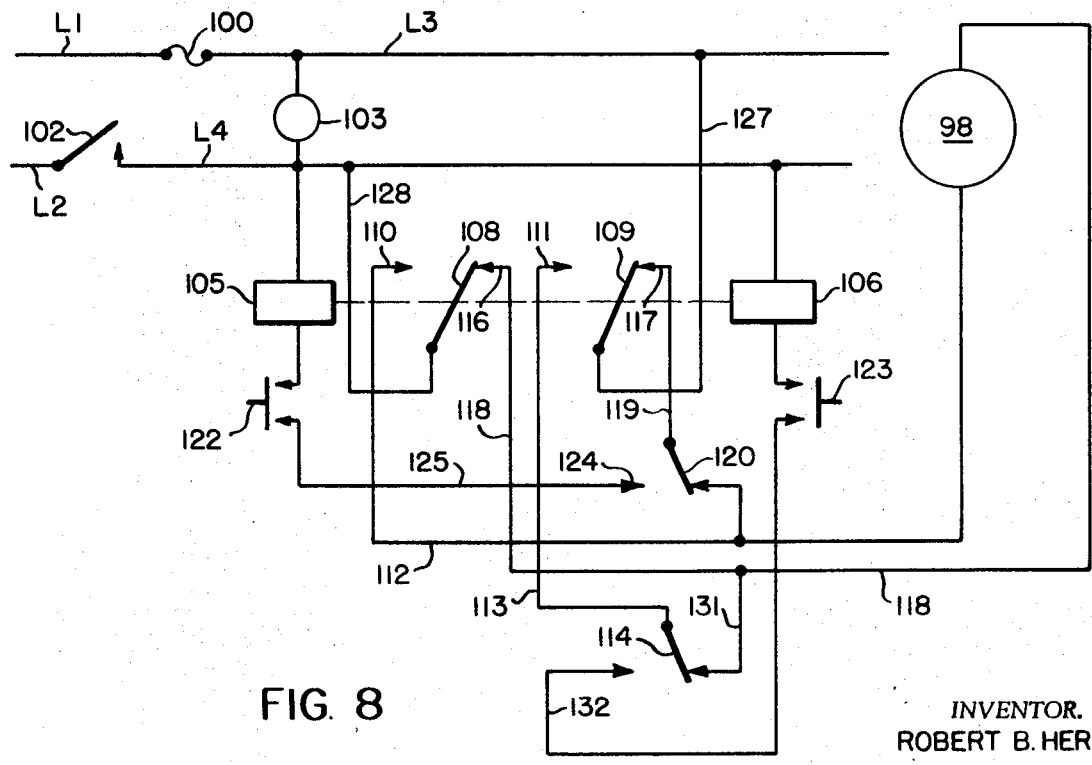
FIG. 8 is a wiring diagram illustrating one type of electrical control system that may be used to operate the retracting mechanisms incorporated in this modified boat.

Referring now to FIG. 8, L1 and L2 represent a direct current (DC) power supply. Line L1 is connected through a conventional fuse 100 to line L3; and line L2 is connected through a manually-operable ON-OFF or safety switch 102 to a line L4. Connected between lines L3 and L4 is a warning lamp 103 for indicating when switch 102 is closed, and power is supplied to lines L3 and L4. Motor 98 may be a reversible DC gear motor; and the rotation of its shaft is controlled by a latching relay represented in FIG. 8 by the coils 105 and 106. When the coil 105 is energized, it moves the associated switch contacts 108 and 109 into engagement with the contacts 110 and 111. Contact 110 is connected by a line 112 to one side of the motor 98; and contact 111 is connected by a line 113 to a limit switch 114. When the coil 106 is energized, switches 108 and 109 move into engagement with the contacts 116 and 117. Contact 116 is connected by line 118 to the opposite side of motor 98; and contact 117 is connected by a line 119 to another limit switch 120.

As shown also in FIG. 5, the limit switches 114 and 120 are mounted in the wheel well 16 of the boat 70 adjacent opposite ends of one of the drive screws 25 for operation, for example, by one of the reciprocable members 75 and 78.

The raising and lowering of the wheels 36, and consequently the advance and retraction of the trailer beam 93, is controlled by two pushbutton switches 122 and 123, which may be referred to as the Lower and Raise pushbuttons, respectively. The wheels 36 will always be in one of two positions, either fully lowered, or fully raised. If the wheels are in their raised or retracted positions, the pushbutton 122 can be depressed to effect the lowering of the wheels; and if the wheels are already lowered, the button 123 can be pushed to effect the raising of the wheels.

Assuming that the wheels are fully retracted, one of the nuts 75 will be in engagement with switch 120, so that its contact or blade will have been swung from the position illustrated in FIG. 8, to the position in which it engages the contact 124, which is connected by line 125 to switch 122. Therefore, assuming that the switch 102 is closed, the wheels can be lowered by momentarily depressing switch 122, thus energizing coil 105 from L4 through the switch 122, line 125, contact 124, switch 120, line 119, switch 109 and line 127 to line L3. This swings the switch contacts 108 and 109 into latching engagement with the contacts 110 and 111. Consequently power is supplied from line L4 through line 128, switch 108, contact 110, line 112, motor 98, lines 118 and 131, switch 114, line 113, switch 109 and line 127 to line L3, thereby energizing the motor 98 to drive its armature in a direction to lower the wheels 36. As soon as the wheels reach their lowered position, one of the drive blocks 78 engages the limit switch 114, disengaging it from line 118 so that the motor stops, and engaging it with the contact in line 132, which is connected to the wheel raising switch 123. This switch, however, is open at the moment, so that the motor remains deenergized.

Thereafter, to retract the wheels and the beam 93, the switch 123 is momentarily depressed, thereby energizing the coil 106 through line 132, the switch 114 which is now engaged with line 132, line 113, switch 109, which has not as yet been unlatched from line 111, and line 127 to line L3. The now-energized coil 106 swings switches 108 and 109 into engagement with the contacts 116 and 117, so that the motor 98 is now energized in a manner to cause its armature to rotate in the opposite direction, and to drive the drive blocks 78 to the left in FIG. 5 until one of them strikes switch 120, at which time the wheels 36 will be fully retracted.

From the foregoing it will be apparent that applicant has developed a sturdy, relatively compact and extremely convenient means for converting a boat from land to water travel, and vice versa. Merely by rotating the shaft 42, both the trailer wheels and the trailer beam 46 or 93 can be readily and simultaneously shifted to and from their retracted positions. Moreover, this operation can be performed in accordance with applicant's invention either manually or by electrically operated power means. Moreover, in each embodiment, the trailer wheels are resiliently mounted either by the springs 30 or 80, so that they absorb road shocks, when the boat is being drawn by means of its trailer beam 46 or 93. Moreover, the cover plates 56 provide relatively simple and efficient means for completely sealing the underside of the wheel well 16 during operation of the boat in the water.

In practice, means (not illustrated) is provided for locking the slides 63 in their "cover closed" positions, as shown in FIGS. 1 and 2, to prevent accidental opening of plates 56 during operation of the boat on water. Any conventional locking means may be employed for this purpose.

Although the cover plates have been shown to be manually operable by blocks 63, it will be understood, that if desired, these plates can be made to shift from their open to their closed positions automatically by the action of water pressure exerted thereon as the boat accelerates. For example, each plate 56 could be provided along its trailing or left hand edge with a downwardly projecting fin or lip, which would project below the bottom of the boat into the water. Such lips would be driven rearwardly in response to increased water pressure exerted thereon during the acceleration of the boat, so as to cause the associated plates 56 to be drawn rearwardly into closed positions. Moreover, if it is so desired, the cover plate pulley mechanism can be power driven and incorporated in the circuit disclosed herein for power driving the wheel mechanism. By means of the pulley and cable mechanism, it is therefore possible to have the covers fully manual from inside the boat, or manual opening and automatic closing by action of the water, or fully power controlled using a motor driven interlocked with the sequencing of the wheel erecting circuitry.

It will be understood that each boat 10 and 70 will be provided at its rear end with conventional trailer or tail lights, together with turn signals that can be connected in any known manner by a conventional electrical interconnect with the turn signals on the vehicle used to haul the boat on land.

Having thus described my invention, what I claim is:
1. A boat, comprising
   a hull having in its bottom a pair of spaced openings disposed adjacent the rear end of the hull,
   a pair of laterally spaced wheel struts mounted at their upper ends to pivot about a horizontal axis extending transversely between opposite sides of the hull adjacent one end of said openings,
   a pair of wheels rotatably mounted on the lower ends of said struts and pivotal by said struts about said axis between operative positions in which said wheels are spaced below the bottom of said hull, and inoperative positions in which said wheels are swung upwardly through said openings and into retracted positions above the bottom of said hull, a trailer beam mounted adjacent the bottom of said hull to reciprocate longitudinally of the hull, and medially of its sides, between a retracted position in which the forward end of the beam is disposed beneath and rearwardly of the forward end of said hull, and an advanced position in which said forward end of said beam projects beyond said forward end of the hull, means on said forward end of said beam for releasably hitching said beam to a vehicle for towing the boat on land, a drive shaft rotatably mounted on said hull adjacent the rear end thereof, and means connecting said drive shaft to said struts and drivingly to the rear end of said beam and operative upon rotation of said shaft in one direction simultaneously to pivot said struts in a direction to move said wheels to their retracted positions, and to draw said beam rearwardly to its retracted position, and operative upon rotation of said shaft in the opposite direction simultaneously to shift said wheels and said beam to their advanced positions, a pair of spaced, parallel, externally-threaded drive screws mounted to rotate above said openings and transverse to said horizontal axis, a pair of nuts threaded on said screws, and mounted for reciprocable movement axially of said screws upon rotation thereof in opposite directions, and a plurality of links pivotally connecting said nuts to struts and operative upon rotation of said screws to pivot said struts about said horizontal axis.

2. A boat, comprising a hull having in its bottom a pair of spaced openings disposed adjacent the rear end of the hull, a pair of laterally spaced wheel struts mounted at their upper ends to pivot about a horizontal axis extending transversely between opposite sides of the hull adjacent one end of said openings, a pair of wheels rotatably mounted on the lower ends of said struts and pivotal by said struts about said axis between operative positions in which said wheels are spaced below the bottom of said hull, and inoperative positions in which said wheels are swung upwardly through said openings and into retracted positions above the bottom of said hull, a trailer beam mounted adjacent the bottom of said hull to reciprocate longitudinally of the hull, and medially of its sides, between a retracted position in which the forward end of the beam is disposed beneath and rearwardly of the forward end of said hull, and an advanced position in which said forward end of said beam projects beyond said forward end of the hull, means on said forward end of said beam for releasably hitching said beam to a vehicle for towing the boat on land, a drive shaft rotatably mounted on said hull adjacent the rear end thereof, means connecting said drive shaft to said struts and to said beam and operative upon rotation of said shaft in one direction simultaneously to pivot said struts in a direction to move said wheels to their retracted positions, and to draw said beam rearwardly to its retracted position, and operative upon rotation of said shaft in the opposite direction simultaneously to shift said wheels to their operative positions and said beam to its advanced position, said connecting means comprising a pair of spaced, parallel, externally-threaded drive screws mounted to rotate above said openings and transverse to said horizontal axis, a pair of nuts threaded on said screws, and mounted for reciprocable movement axially of said screws upon rotation thereof in opposite directions, a plurality of links pivotally connecting said nuts to said struts and operative upon rotation of said screws to pivot said struts about said horizontal axis, said connecting means further including a third externally threaded drive screws mounted to rotate adjacent the underside of said hull parallel to said pair of screws, means connecting said third screw to said beam to reciprocate said beam in response to the rotation of said third screw in opposite directions, and means connecting said drive screws to said drive shaft for simultaneous operation thereby.

3. A boat as defined in claim 2, including a reversible electric motor connected to said drive shaft to rotate the latter, and a control circuit for operating said motor, including a pair of spaced, limit switches mounted adjacent opposite ends, respectively, of one of said drive screws to be tripped alternately upon movement of said wheels and said beam from one to another of their limit positions, one of said switches being operative, when tripped to stop said motor and condition said circuit for rotating said motor in one direction, and the other of said switches, when tripped, being operative to stop said motor and condition said circuit for rotating said motor in the opposite direction.

4. A boat, comprising a hull having a transverse partition extending between opposite sides of the hull adjacent the rear end thereof, and having a pair of spaced wheel openings formed in the bottom of the hull rearwardly of said partition and adjacent opposite sides, respectively, of the hull, a pair of laterally spaced wheel struts pivotally mounted at their upper ends on the rear of said partition for swinging movement about a horizontal axis extending transversely between opposite sides of said hull, each of said struts having a wheel rotatably mounted on the lower end thereof, a pair of drive blocks mounted to reciprocate rearwardly of said partition along spaced, parallel paths above said openings and at right angles to said horizontal axis, means connecting said blocks to said struts and operative upon movement of said blocks to first limit positions in one direction to pivot said struts about said horizontal axis to operative positions in which said struts project at their lower ends through said openings to support said wheels beneath the bottom of said hull, and operative upon movement of said blocks to second limit positions in the opposite direction to swing said wheels and the lower ends of said struts upwardly through said openings to retracted positions above the bottom of said hull, a pair of cover plates mounted for sliding movement in the bottom of said hull between open positions in which said plates are positioned forwardly of said partition to clear said wheel openings, and closed positions in which said plates are positioned over said openings rearwardly of said partition to seal said openings, when said wheels and struts are in their retracted positions.

a retractable trailer beam mounted to reciprocate adjacent the underside of said hull parallel to said blocks, and along a path disposed medially of the sides of said hull between an advanced position in which the forward end of said beam projects beyond the forward end of said hull, and a retracted position in which said forward end of said beam is spaced rearwardly of said forward end of the hull, a drive shaft mounted in said partition to rotate selectively in opposite directions about an axis parallel to the direction of reciprocation of said blocks and said beam, and means connecting said shaft to said blocks and said beams to reciprocate said blocks and said beam upon rotation of said shaft in opposite directions, thereby to effect the simultaneous advance and retraction, respectively, of said wheels and beam.

5. A boat as defined in claim 4, wherein said connecting means comprises
   a pair of spaced, parallel, externally threaded drive screws mounted rearwardly of said partition for rotation about axes parallel to the axis of said shaft, and drivingly engaged with said blocks to reciprocate the latter upon rotation of said screws in opposite directions, respectively,
   a third, externally threaded drive screw mounted to rotate adjacent the bottom of said hull parallel to said pair of screws, and drivingly connected to said beam, and
   means interconnecting said screws with said drive shaft and operative to transmit the rotation of said shaft simultaneously to said screws.

6. A boat as defined in claim 5 including
   a pair of resilient metal straps, each of which is secured at one end to the rear of said partition, and which has a partially coiled free end projecting rearwardly of said partition above the forward end of one of said openings, and
   means connecting the upper ends of said struts to the free ends of said springs resiliently to support the said struts for pivotal movement about said horizontal axis.

7. A boat as defined in claim 5, wherein
   a nut is threaded on each of said pair of screws,
   each of said blocks is mounted for axial reciprocation on one of said pair of screws,
   a coiled compression spring surrounds each of said pair of screws between the associated nut and block thereon, and
   lost-motion means connects said nuts to said blocks to allow limited movement between the said nuts and said blocks against the resistance of the compression springs interposed therebetween.

8. A boat as defined in claim 5, wherein
   said beam is tubular and is mounted at its rear end to reciprocate in a pair of spaced bearings secured in a longitudinal recess formed in said hull adjacent the bottom thereof and forwardly of said partition,
   a key is secured in one of said bearings to slide in an axial slot in said beam, and
   said third screw is threaded at its forward end into the rear end of said beam, and is drivingly connected adjacent its rear end to said drive shaft for rotation thereby.

9. A boat as defined in claim 5, wherein
   a tubular housing is secured to the bottom of said hull adjacent its forward end and medially of its sides.
   said beam is tubular and is slidable at its rear end in the bore of said tubular housing,
   said housing and said beam are rectangular in cross section, and
   said third screw threads at its forward end into a nut secured in the rear end of the bore in said beam, and is drivingly connected adjacent its rear end to said drive shaft.

10. A boat as defined in claim 4, including
    electrically operated power means connected to said drive shaft and operable to drive said shaft selectively in opposite directions,
    a first switch operable manually, when said wheels and beam are retracted, to operate said power means to drive said shaft in a direction to effect the movement of said wheels and beam to their advanced positions,
    a second switch operable manually, when said wheels and beam are in their advanced positions, to operate said power means to drive said shaft in a direction to retract said wheels and beam, and
    a pair of spaced limit switches connected in circuit with said power means and said first and second switches, and mounted rearwardly of said partition for operation by one of said blocks to interrupt the operation of said power means each time said one block moves from one to the other of its limit positions.

References Cited

UNITED STATES PATENTS

| | | | |
|---|---|---|---|
| 3,121,238 | 2/1964 | Levinson | 9—1 |
| 3,143,749 | 8/1964 | Buchholz et al. | 9—1 |

FOREIGN PATENTS

| | | | |
|---|---|---|---|
| 649,243 | 1/1951 | Great Britain | 9—1 |

MILTON BUCHLER, Primary Examiner

F. K. YEE, Assistant Examiner

U.S. Cl. X.R.

280—414A